(12) United States Patent
Brunson

(10) Patent No.: US 9,962,881 B2
(45) Date of Patent: May 8, 2018

(54) TOOLING AND PROCESS FOR INJECTION STRETCH BLOW MOLDED CONTAINER WITH INTEGRAL HANDLE

(71) Applicant: R&D Tool & Engineering Co., Lees Summit, MO (US)

(72) Inventor: Dave Brunson, Raymore, MO (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 834 days.

(21) Appl. No.: 14/491,243

(22) Filed: Sep. 19, 2014

(65) Prior Publication Data

US 2016/0082645 A1 Mar. 24, 2016

(51) Int. Cl.

| | |
|---|---|
| *B29C 49/48* | (2006.01) |
| *B29C 49/06* | (2006.01) |
| *B29B 11/08* | (2006.01) |
| *B29C 49/12* | (2006.01) |
| *B29C 45/26* | (2006.01) |

(Continued)

(52) U.S. Cl.
CPC ............ *B29C 49/482* (2013.01); *B29B 11/08* (2013.01); *B29C 49/06* (2013.01); *B29B 11/14* (2013.01); *B29B 2911/1402* (2013.01); *B29B 2911/1404* (2013.01); *B29B 2911/14026* (2013.01); *B29B 2911/14033* (2013.01); *B29B 2911/14336* (2015.05); *B29B 2911/14337* (2015.05); *B29B 2911/14513* (2013.01); *B29C 45/261* (2013.01); *B29C 45/2618* (2013.01); *B29C 45/33* (2013.01); *B29C 49/12* (2013.01); *B29C 49/4823* (2013.01); *B29C 2049/483* (2013.01); *B29C 2049/4846* (2013.01); *B29K 2105/258* (2013.01); *B29L 2031/7158* (2013.01)

(58) Field of Classification Search
None
See application file for complete search history.

(56) References Cited

U.S. PATENT DOCUMENTS

| | | | |
|---|---|---|---|
| 4,280,630 A | 7/1981 | Hafele | |
| 4,280,805 A | 7/1981 | Hafele | |
| | (Continued) | | |

FOREIGN PATENT DOCUMENTS

| | | |
|---|---|---|
| CA | 1151566 A1 | 8/1983 |
| CA | 2412364 C | 2/2008 |
| | (Continued) | |

OTHER PUBLICATIONS

Search Report and Written Opinion dated Dec. 29, 2015 for related PCT Patent Application No. PCT/US2015/040908, filed on Jul. 17, 2015, 18 pages.

*Primary Examiner* — Monica Huson
(74) *Attorney, Agent, or Firm* — Hovey Williams LLP

(57) ABSTRACT

Injection stretch blow molding tooling for forming at least one parison and at least one stretch blown article having an integral handle. The tooling includes at least one cavity block, a body mold supported within the cavity block, a handle mold supported within the cavity block, and a thread split assembly positioned adjacent to said cavity block. The thread split assembly includes first and second thread split halves shiftable between an open position and a closed position. As such, the body mold, the handle mold, and the thread split assembly cooperatively define a parison-forming cavity, with such parison-forming cavity including a body cavity for forming a body of the parison and a handle cavity for forming a handle of the parison.

27 Claims, 14 Drawing Sheets

(51) Int. Cl.
  *B29L 31/00*   (2006.01)
  *B29B 11/14*   (2006.01)
  *B29K 105/00*  (2006.01)
  *B29C 45/33*   (2006.01)

(56) References Cited

U.S. PATENT DOCUMENTS

| | | |
|---|---|---|
| 4,311,246 A | 1/1982 | Saito et al. |
| 4,372,454 A | 2/1983 | Thompson |
| 4,372,455 A | 2/1983 | Cochran |
| 4,629,598 A | 12/1986 | Thompson |
| 5,508,076 A | 4/1996 | Bright |
| 5,647,930 A | 7/1997 | Bright |
| 6,789,689 B1 | 7/2004 | Beale |
| 6,896,943 B1 | 5/2005 | Beale |
| 7,150,371 B1 | 12/2006 | Larson et al. |
| 8,524,143 B2 | 9/2013 | Thibodeau |
| 8,550,272 B2 | 10/2013 | Yourist |
| 8,574,486 B2 | 11/2013 | Jaksztat et al. |
| 2009/0243161 A1 | 10/2009 | Beale |

FOREIGN PATENT DOCUMENTS

| | | |
|---|---|---|
| CA | 2617591 C | 10/2013 |
| WO | 96/08356 A | 3/1996 |

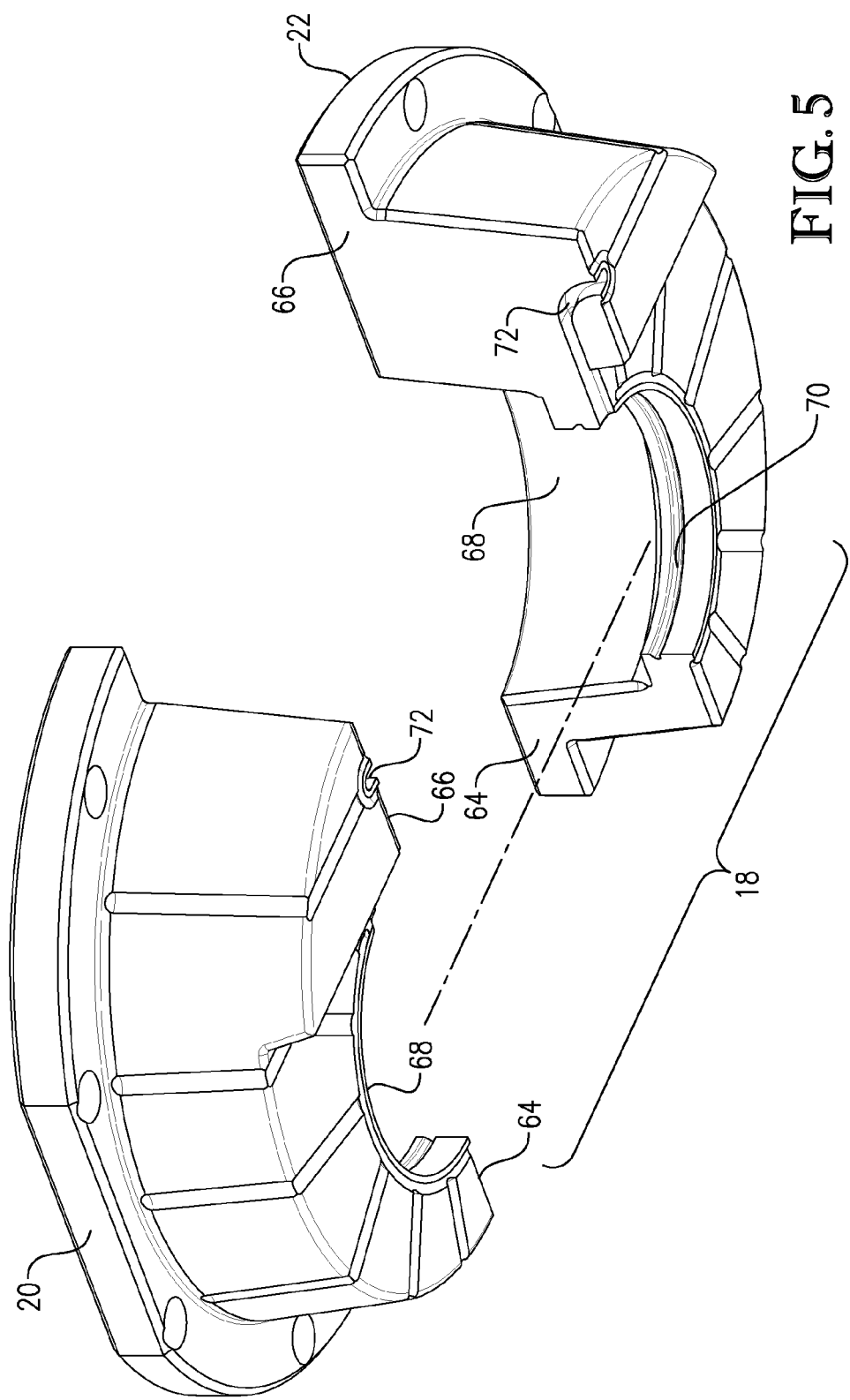

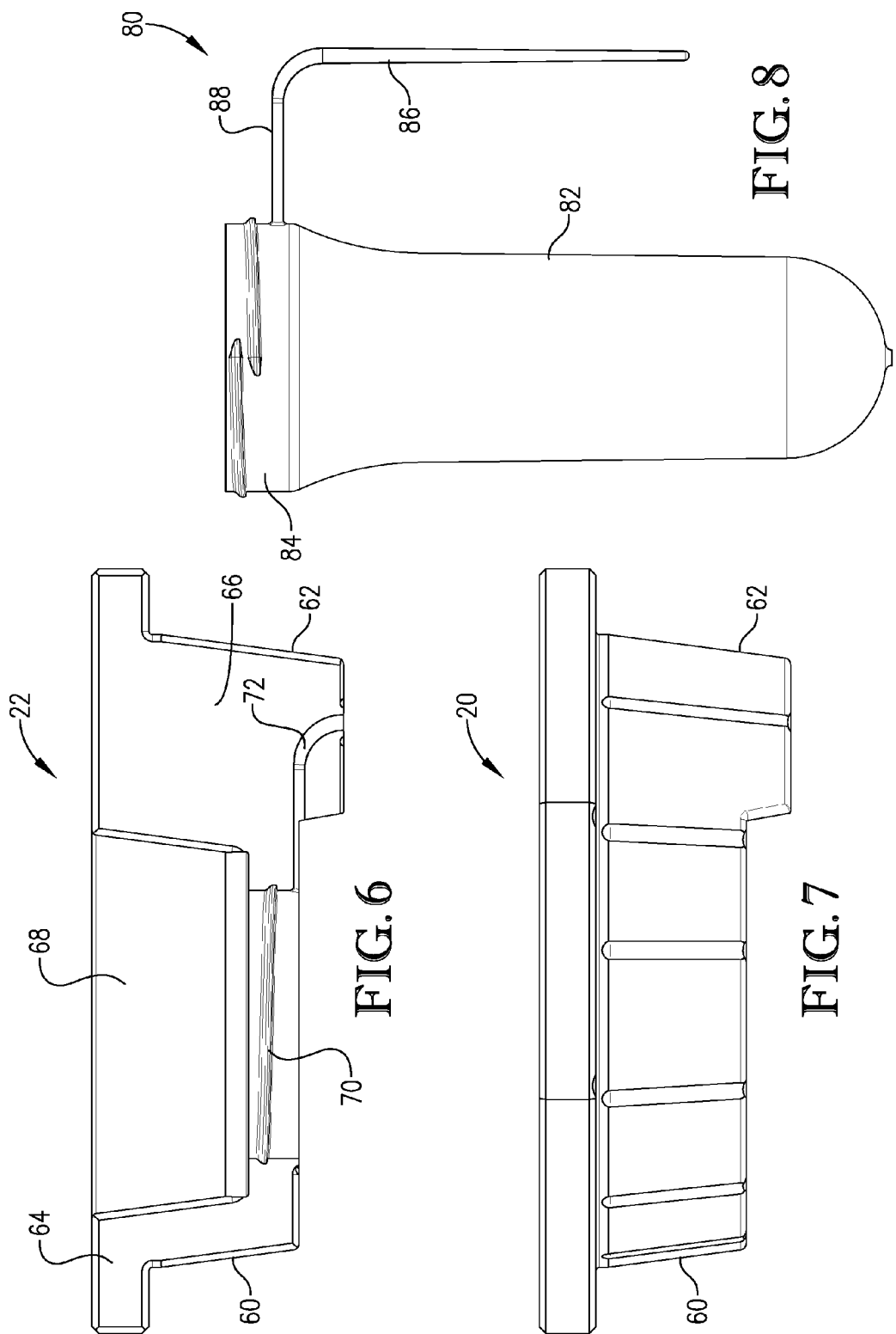

TOOLING AND PROCESS FOR INJECTION STRETCH BLOW MOLDED CONTAINER WITH INTEGRAL HANDLE

BACKGROUND OF THE INVENTION

1. Field of the Invention

Embodiments of the present invention relate to an injection stretch blow mold tooling, system, and process. In particular, embodiments of the present invention relate to a tooling, a system, and a process for forming parisons and articles, such as containers having integral handles.

2. Description of Related Art

Injection stretch blow molding (ISBM) is a technique used for creating various articles, such as plastic bottles and other containers. ISBM processes are performed with an ISBM machine that: injection molds a resin into one or more parisons of desired shape, conditions the parisons in preparation for stretch blow molding, stretch blow molds the parisons into final molded articles, and then ejects the molded articles from the ISBM machine. ISBM machines are generally provided in two types, 3-stage or 4-stage. A 4-stage ISBM machines will generally include an injection station for injection molding the resin into a parison, a conditioning station for conditioning the parison (e.g., applying heat to the parison), a stretch blow station for stretch blow molding the parison into a final molded articles, an ejection station for ejecting the molded article from the ISBM machine, and a rotation plate for transferring the parison and/or the molded article between each of the stations of the ISBM machine. A 3-stage ISBM machine differs from the 4-stage machine in that the 3-stage machine may not include a conditioning station.

Typically, the molded articles formed by the ISBM machine are containers. Such containers will often be manufactured in the form of plastic bottles, with such bottles having a main body and a neck extending up from the main body. Certain bottles may preferably include integral handles that will facilitate the handling and transportation of the bottles. Furthermore, some bottles may be configured to hold significant amounts of fluid or other materials. In such instances, it may be preferred for the bottles' integral handles to be attached to the bottles at two connection points so as to provide for enhanced support during handling and transportation. However, for bottles made via ISBM, such as bottles formed from PET, it is difficult to form integral handles that are connected to the parisons and/or the bottles at two connection points.

For example, it is inherently difficult to injection mold a parison having an integral handle. Certain known processes are used in which a main body of a parison and a handle are formed separately. The body and the handle may then be subsequently connected together. However, the connection points between such separately formed handle and parison lack the inherent strength of an integrally-formed handle. Next, even if a parison can be injection molded with an integral handle connected to the parison at two points, it is difficult, and nearly impossible, to satisfactorily stretch blow the parison into a container. Such difficulty is due to the handle interfering with and/or obstructing the stretch blow process. Specifically, the handle will generally interfere with the inherent stretching capabilities and characteristics of the body of the parison. Additionally, with the handle connected to the parison at two points, the two points will stretch apart from each other during the stretch blowing process, such that the handle must similarly stretch.

As such, it would be desirable to have ISBM tooling, systems, and processes for producing molded articles (e.g., containers) with integral handles, and in particular, for producing molded articles that include integral handles that are secured to the molded articles at two connection points.

SUMMARY OF THE INVENTION

Embodiments of the present invention include injection station tooling for forming at least one parison. The tooling includes at least one cavity block, a body mold supported within the cavity block, a handle mold supported within the cavity block, and a thread split assembly positioned adjacent to said cavity block. The thread split assembly includes first and second thread split halves shiftable between an open position and a closed position. As such, the body mold, the handle mold, and the thread split assembly cooperatively define a parison-forming cavity, with such parison-forming cavity including a body cavity for forming a body of the parison and a handle cavity for forming a handle of the parison.

Embodiments of the present invention additionally include conditioning station tooling for an injection stretch blow molding machine, with the tooling being configured for conditioning at least one parison having a handle. The tooling comprises at least one dowel configured to receive at least a portion of the handle of the parison. The dowel is configured to rotate, such that with the portion of the handle received within the dowel, the dowel is operable to reshape at least a portion of the handle.

Embodiments of the present invention further include a process for forming at least one injection stretch blow molded container with an injection stretch blow molding machine. The process includes (a) injecting a resin into a parison-forming cavity to form a parison having a body and a handle extending from the body. The injecting of step (a) includes injecting the resin into a body cavity of the parison-forming cavity. Additionally, a portion of the resin injected into the body cavity passes from the body cavity into a handle cavity. Next, the process includes (b) conditioning at least a portion of the parison. The conditioning of step (b) includes reshaping an end portion of the handle, such that the end portion is at least partially orientated toward the body of the parison. A next step in the process includes (c) stretch blowing the parison to form a container having an integral handle. The stretch blowing of step (c) includes stretch blowing the body of the parison until a portion of the body engages the end portion of the handle. Finally, the process includes (d) ejecting the container from the injection stretch blow molding machine.

Still further embodiments of the present invention include stretch blow station tooling for stretch blowing at least one parison into a molded article with an injection stretch blow molding machine. The tooling comprises at least one blow mold assembly including first and second blow mold halves shiftable between an open position and a closed position. The first and second blow mold halves each include a body cavity half formed therein. In the closed position, the body cavity halves of the first and second blow mold halves are aligned to define a blow cavity. The first and second blow mold halves each include a handle channel formed therein, such that in the closed position, the handle channels of the first and second blow mold halves are aligned to define a handle-supporting cavity.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described in detail below with reference to the attached drawing figures, wherein:

FIG. 5 is a bottom perspective view of the thread split assembly from FIG. 5, with the first and second thread split halves in an open position;

FIG. 6 is a side elevation view of the second thread split half from FIGS. 4-5, showing an interior side of the second thread split half;

FIG. 7 is a side elevation view of the first thread split half from FIGS. 4-5, showing an exterior side of the first thread split half;

FIG. 8 is a side elevational view of a parison formed according to embodiments of the present invention;

Figure 1:
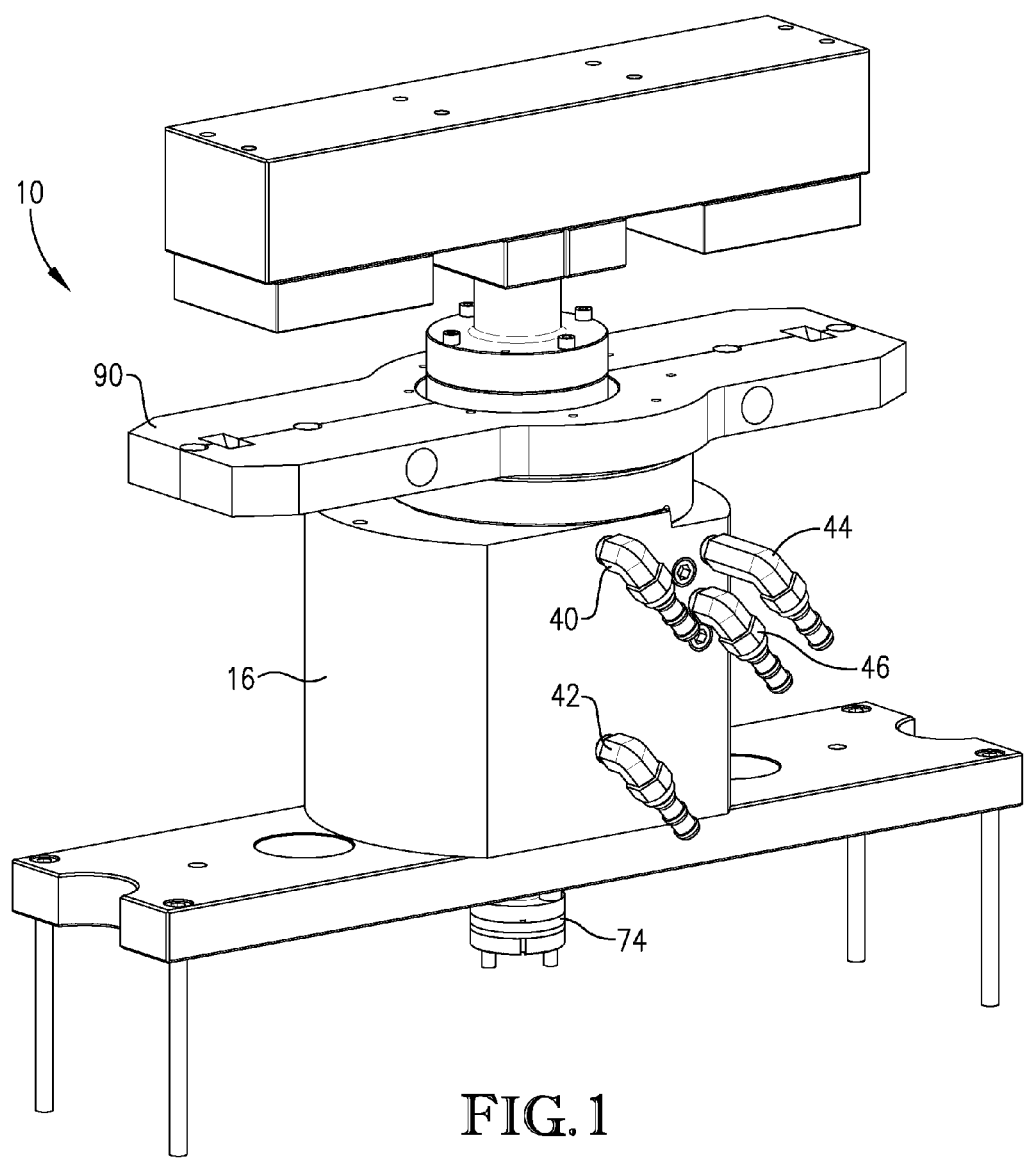
FIG. 1 is a perspective view of injection station tooling according to embodiments of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention are directed to tooling, systems, and processes for use with ISBM machines. However, it is to be appreciated that the principles of the present invention are not limited to the ISBM machines. The principles of the present invention may be beneficially applied to any container-forming machine having tooling for an injection station, a conditioning station, and/or a stretch blow station, as described below.

ISBM machines used in embodiments of the present invention may be similar to the ISBM machine described and illustrated in U.S. Pat. No. 7,381,045, entitled "QUICK CHANGE BLOW MOLD TOOLING," which is incorporated by reference herein in its entirety. In more detail, the ISBM machine may include an injection station comprising an injection nozzle that injects molten plastic material, such as PET, into mold cavities to form parisons. The parisons that are formed at the injection station are then carried by a rotation plate of the ISBM machine to a conditioning station for additional processing, such as heat treating. From the conditioning station, the parisons are transferred to a stretch blow station where the parisons are expanded by pressurized air and a stretch rod into final molded articles, such as full-sized bottles. Finally, the articles are transferred to an ejection station where the articles are discharged from the ISBM machine.

Figure 2:
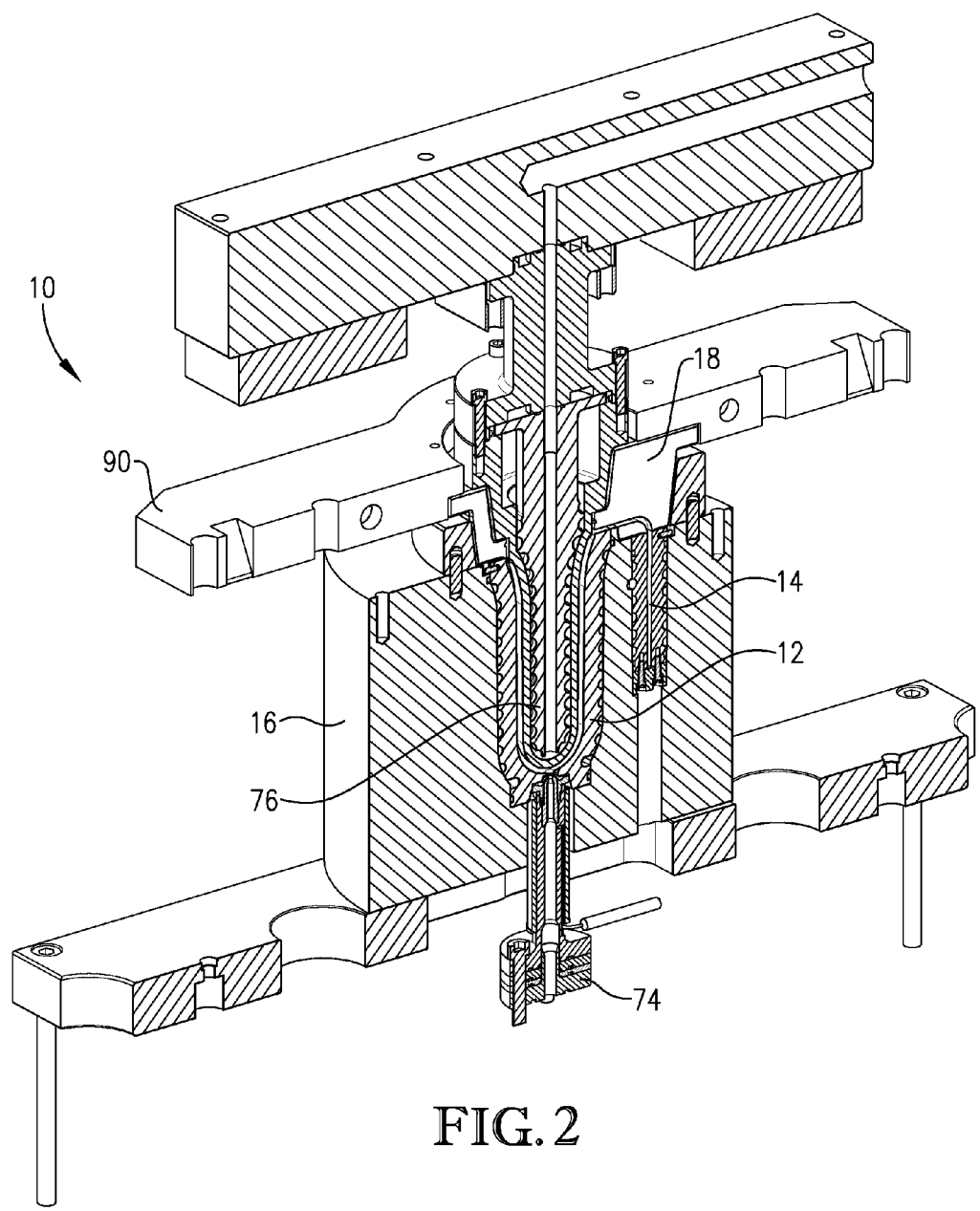
FIG. 2 is a perspective cross-section view of the injection station tooling of FIG. 1, showing portions of a body mold and a handle mold within a cavity block, and further showing portions of a thread split assembly adjacent to the cavity block.
Figure 3:
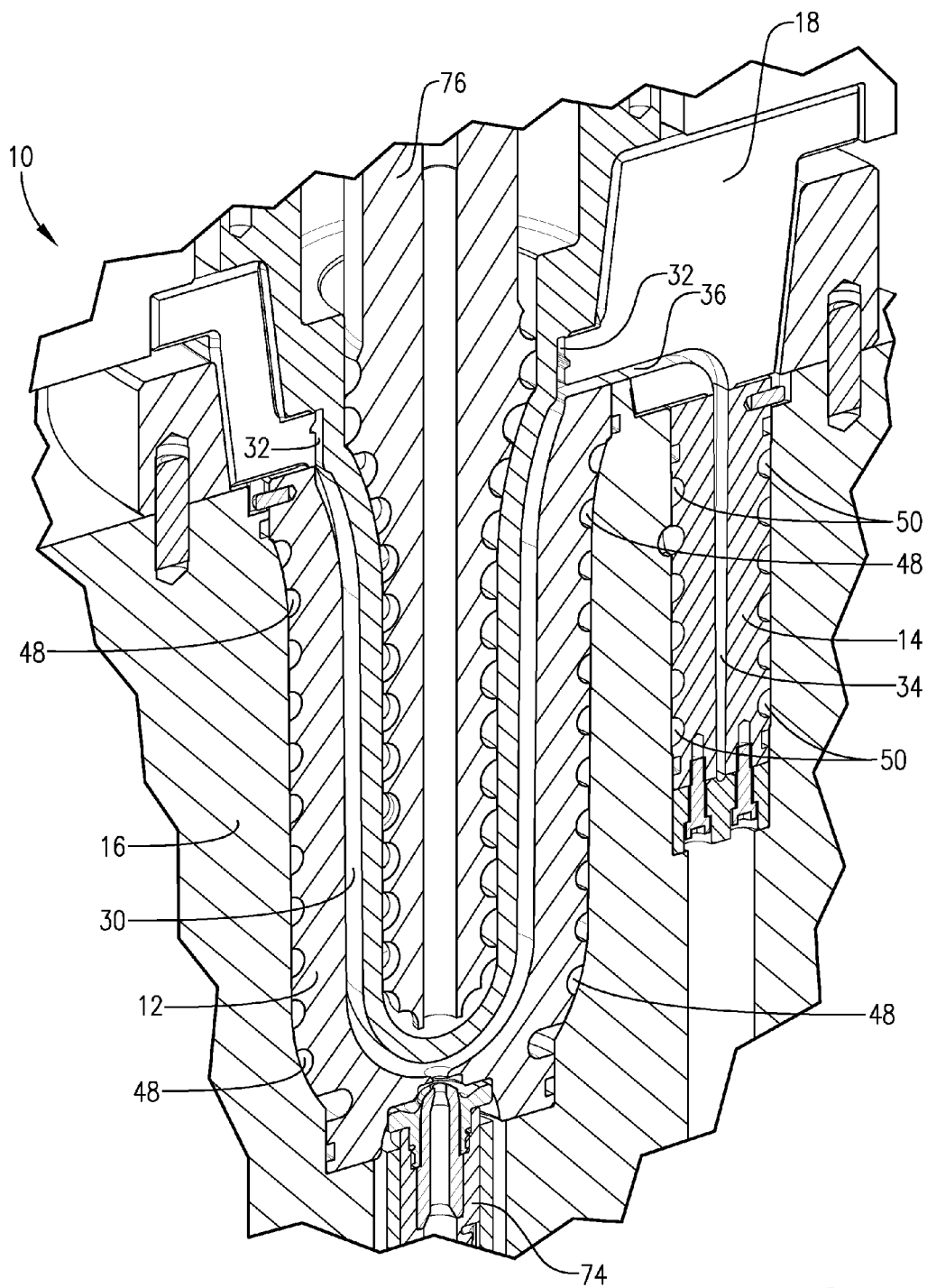
FIG. 3 is an enlarged partial view of the perspective cross-section of FIG. 2, with the portions of the body mold, the handle mold, and the thread split assembly enlarged.

Embodiments of the present invention broadly include injection station tooling 10, as illustrated in FIGS. 1-3, which is configured for use in an ISBM machine for injection molding a resin into one or more parisons, with each parison having an integral handle. As illustrated, the injection station tooling 10 may comprise a body mold 12 and a handle mold 14, each being supported within a cavity block 16, and a thread split assembly 18 adjacent to an upper portion of the cavity block 16 and comprising first and second thread split halves 20, 22 (see FIGS. 4-7) shiftable between an open position and a closed position. The body mold 12, the handle mold 14, and the thread split assembly 18 cooperatively define a parison-forming cavity, with the parison-forming cavity including a body cavity for forming a body of the parison and a handle cavity for forming an integral handle of the parison. As such, the injection station tooling 10 is configured to receive injected resin in the body and handle cavities of the parison-forming cavity so as to form a parison with an integral handle. Although the description provided herein details a single cavity block 16, it is understood that the injection station tooling 10 may include a plurality of cavity blocks 16, each including their own body and handle molds 12, 14, such that the injection station tooling 10 is operable to simultaneously form a plurality of parisons, each having integral handles.

In some embodiments, the body cavity may include a main portion 30 and a neck portion 32, with the body mold 12 defining the main portion 30 of the body cavity, and the thread split assembly 18 defining the neck portion 32 of the body cavity. Furthermore, in some embodiments, the handle cavity will include a main portion 34 and a connection portion 36, with the handle mold 14 defining the main portion 34 of the handle cavity, and the thread split assembly 18 defining the connection portion 36 of the handle cavity. As such, the body mold 12 and a portion of the thread split assembly 18 may cooperatively present a body cavity surface, which may define the exterior shape of the body of the parison that is to be injection molded via the injection station tooling 10. Similarly, the handle mold 14 and a portion of the thread split assembly 18 may cooperatively present a handle cavity surface, which may define the exterior shape of the handle of the injection molded parison As perhaps best shown in FIG. 3, in certain embodiments, the body cavity is generally elongated and extends about a body cavity longitudinal axis. In addition, in some embodiments, the main portion 34 of the handle cavity will be generally elongated and will extend about a handle cavity longitudinal axis. In certain embodiments the handle cavity longitudinal axis will be generally parallel with the main body longitudinal axis. Or stated differently, the handle mold 14 may be generally parallel with the body mold 12.

In some embodiments, the cavity block 16 may comprise a generally block-shaped component formed from stainless steel, steel alloy, or other high-strength material. The cavity block 16 may include one or more cavities formed therein for receiving molds, such as the body mold 12 and/or the handle mold 14. Embodiments may provide for such cavities to be formed in the cavity block 16 via a molding or milling processes. In certain embodiments, the body mold 12 and the handle mold 14 may similarly be formed from a high strength material, such as stainless steel or a steel alloy. The body mold 12 and the handle mold 14 may be formed in a specified size and shape via molding or milling.

In certain embodiments, the body mold 12 and the handle mold 14 may each be associated with heat transfer conduits for regulating respective temperatures of the body cavity surface and the handle cavity surface. For example, with reference to FIG. 1, the cavity block 16 may include a first inlet 40 for receiving heat transfer fluids and a first outlet 42 for removing the heat transfer fluids. Similarly, the cavity block 16 may include a second inlet 44 for receiving heat transfer fluids and a second outlet 46 for removing the heat transfer fluids. With reference to FIG. 3, the first inlet 40 can direct heat transfer fluids to a first heat transfer channel 48 defined by the space between the cavity block 16 and the body mold 12, with such first heat transfer channel 48 extending from a top portion of the body mold 12 to a bottom portion of the body mold 12. Thus, the heat transfer fluid will flow through the first heat transfer channel 48 and exit from the cavity block 16 through the first outlet 42. Similarly, the second inlet 44 can direct heat transfer fluid to a second heat transfer channel 50 defined by the space between the cavity block 16 and the handle mold 14, with such second heat transfer channel 50 extending from a top portion of the handle mold 14 to a bottom portion of the handle mold 14. Thus, the heat transfer fluid will flow through the second heat transfer channel 50 and exit from the cavity block 16 through the second outlet 46. As such, embodiments of the present invention provide for the respective temperatures of the body mold 12, including the body cavity surface, and the handle mold 14, including the handle cavity surface, to be independently regulated. The temperatures may be regulated by passing heating or cooling fluids through the heat transfer channels 48, 50 by way of heat transfer inlets 40, 44 and outlets 42, 46.

Figure 4:
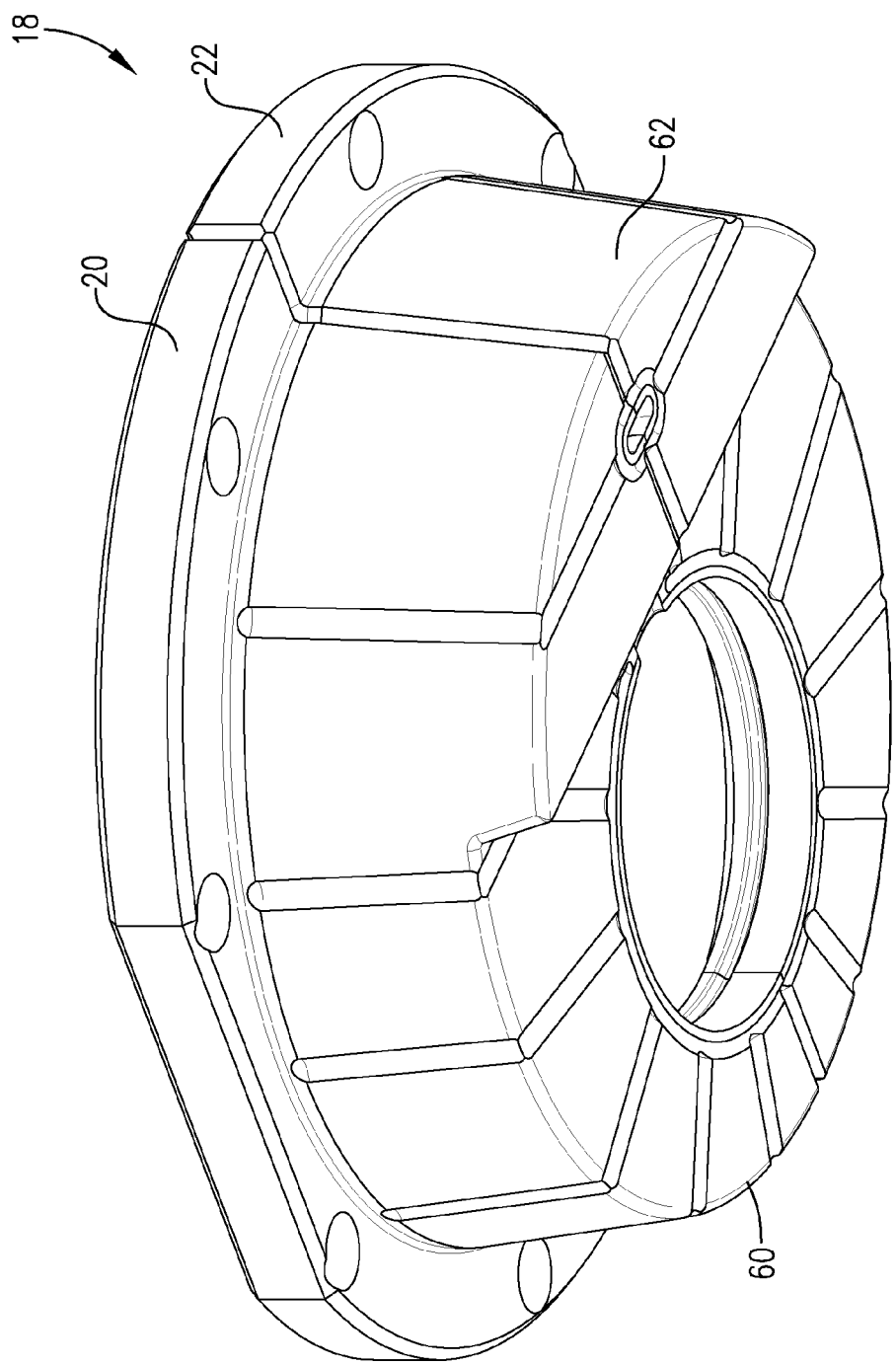
FIG. 4 is a bottom perspective view of a thread split assembly, with the thread split assembly including first and second thread split halves in a closed position.

As with the cavity block 16 and/or molds 12, 14, the thread split assembly 18 can be formed from a high-strength material, such as pre-hardened mold steel, stainless steel, steel alloy, or the like. As illustrated by FIG. 4, when the first and second thread split halves 20, 22 of the thread split assembly 18 are in the closed position, the thread split assembly 18 forms a generally elongated ring-like structure having a first end 60 and a second end 62, with the second end 62 being generally enlarged compared with the first end 60. As perhaps best shown in FIGS. 5-7, the first and second thread split halves 20, 22 each include first and second flat aligned inner faces 64, 66, with such faces 64, 66 extending on opposite sides of curved inner surfaces 68. Certain embodiments provide for the curved inner surfaces 68 to include indentations 70 formed thereon. Such indentations 70 provide for the curved inner surfaces 68 to act as a thread-forming components configured to form threads on a neck of the injection molded parison.

Furthermore, in some embodiments, the second flat inner faces 66 of the first and second thread split halves 20, 22 will be on the enlarged second end 62 of the thread split assembly 18, such that the second flat inner faces 66 are generally larger than the first flat aligned inner faces 64. The generally large size of the second inner faces 66 facilities the inclusion of a groove 72 formed in the second inner face 66 of each of the first and second thread split halves 20, 22. In particular, the grooves 72 on the second inner faces 66 are generally aligned, such that when the thread split halves 20, 22 are in the closed position, the grooves 72 cooperatively form a handle-forming channel.

As seen in FIGS. 2-3, when the thread split assembly 18 is positioned adjacent to a top portion of the cavity block 16, the thread split assembly 18, the body mold 12, and the handle mold 14 cooperatively define the parison-forming cavity. As perhaps best shown in FIG. 3, the body mold 12 defines the main portion 30 of the body cavity of the parison-forming cavity, while the thread split assembly 18 forms the neck portion 32 of the body cavity. Additionally, the handle mold 14 forms the main portion 34 of the handle cavity, while the thread split assembly 18 forms the connection portion 36 of the handle cavity, with the connection portion 36 of the handle cavity being defined by the handle-forming channel of the thread split assembly 18. Furthermore, and as illustrated in FIG. 3, the handle-forming channel fluidly connects the body cavity with the handle cavity, and specifically, connects the neck portion 32 of the body cavity with the main portion 34 of the handle cavity. As such, the connection portion 36 of the handle cavity may extend generally horizontally from the neck portion 32 of the body cavity, so as to be generally perpendicular with the main portion 30 and/or the neck portion of the body cavity. Additionally, the main portion 34 of the handle cavity may extend generally vertically from the connection portion 36 of the handle cavity, so as to be generally parallel with the main portion 30 and/or the neck portion 32 of the body cavity. In certain instances, the handle cavity may include an arcuate section linking the main portion 34 and the connection portion 36 of the handle cavity.

With reference to FIGS. 1-3, the ISBM machine may include a resin feed system 74 coupled in fluid-flow communication with the body mold 12, so as to be operable to inject resin into the parison-forming cavity. As such, and with reference to FIGS. 2-3, to injection mold a parison, a core rod 76 is inserted through the thread split assembly 18 and within the body mold 12 so as to be in general alignment with the body cavity. The core rod 76 may be shaped so as to facilitate a desired interior shape of the injection molded parison. In particular, just as the body mold 12 and the thread split assembly 18 cooperatively present a body cavity surface, which is operable to define the exterior shape of the body of the parison, the core rod 76 presents a core rod surface that is operable to define the interior shape of the body of the parison.

With the core rod 76 aligned within the body cavity, as shown in FIGS. 2-3, resin can be injected into the parison-forming cavity. Initially, the resin fills the main portion 30 of the body cavity, and particular, the space within the main portion 30 between the body mold 12 and the core rod 76. From the main portion 30 of the body cavity, the resin then fills the neck portion 32 of the body cavity, and particularly, the space within the neck portion 32 between the thread insert assembly 18 and the core rod 76. From the neck portion 32 of the body cavity, the resin travels to and fills the handle cavity of the parison-forming cavity. In particular, the resin travels from the neck portion 32 through the connection portion 36 of the handle cavity, as defined by the handle-forming channel of the thread split assembly 18, and into the main portion 34 of the handle cavity. Thus, resin fills the entire parison-forming cavity and may remain therein until the resin cools and/or solidifies enough that it can at least temporarily hold its shape. At such a time, the core rod 76 can be removed from the body cavity 12 and the thread split assembly 18.

As such, and as illustrated by FIG. 8, an injection molded parison 80 formed from the injection station tooling 10 may include a body having a main portion 82 and neck portion 84 extending up from the main portion 82. Similarly, the parison 80 will include a handle extending from the body at a single connection point. The handle may include a main portion 86 and a connection portion 88, with the connection portion 88 connecting the main portion 86 of the handle to the neck portion 84 of the body of the parison 80. As shown, the connection portion 88 may extend generally horizontally from the neck portion 84 of the body, so as to be perpendicular with the main portion 82 of the body of the parison 80. Additionally, the main portion 86 of the handle may extend generally vertically from the connection portion 88, so as to be generally parallel with the main portion 82 of the body of the parison 80. In certain instances, the handle may include an arcuate section linking the main portion 86 and the connection portion 88 of the handle.

From the injection station, the parison 80 with the integral handle may be transferred, via the thread split assembly 18, to the conditioning station. In addition to defining the neck portion 32 of the body cavity and the connection portion 36 of the handle cavity, the thread split assembly 18 is configured to retain a grip around the neck portion 84 of the injection molded parison 80, such that the parison 80 can be transferred between stations of the ISBM machine via the thread split assembly 18. With reference to FIGS. 1-2, to further facilitate such transferring, the ISBM machine may include a carrier plate 90 that is configured to be secure to the thread split assembly 18 and to facilitate transfer of the thread split assembly 18 and the parison 80. As such, the ISBM machine can actuate the carrier plate 90, and thus provide for a corresponding actuation of the thread split assembly 18 and the associated parison 80. In such a fashion, the injection molded parison 80 may be transferred from the injection station to the conditioning station.

Figure 9:
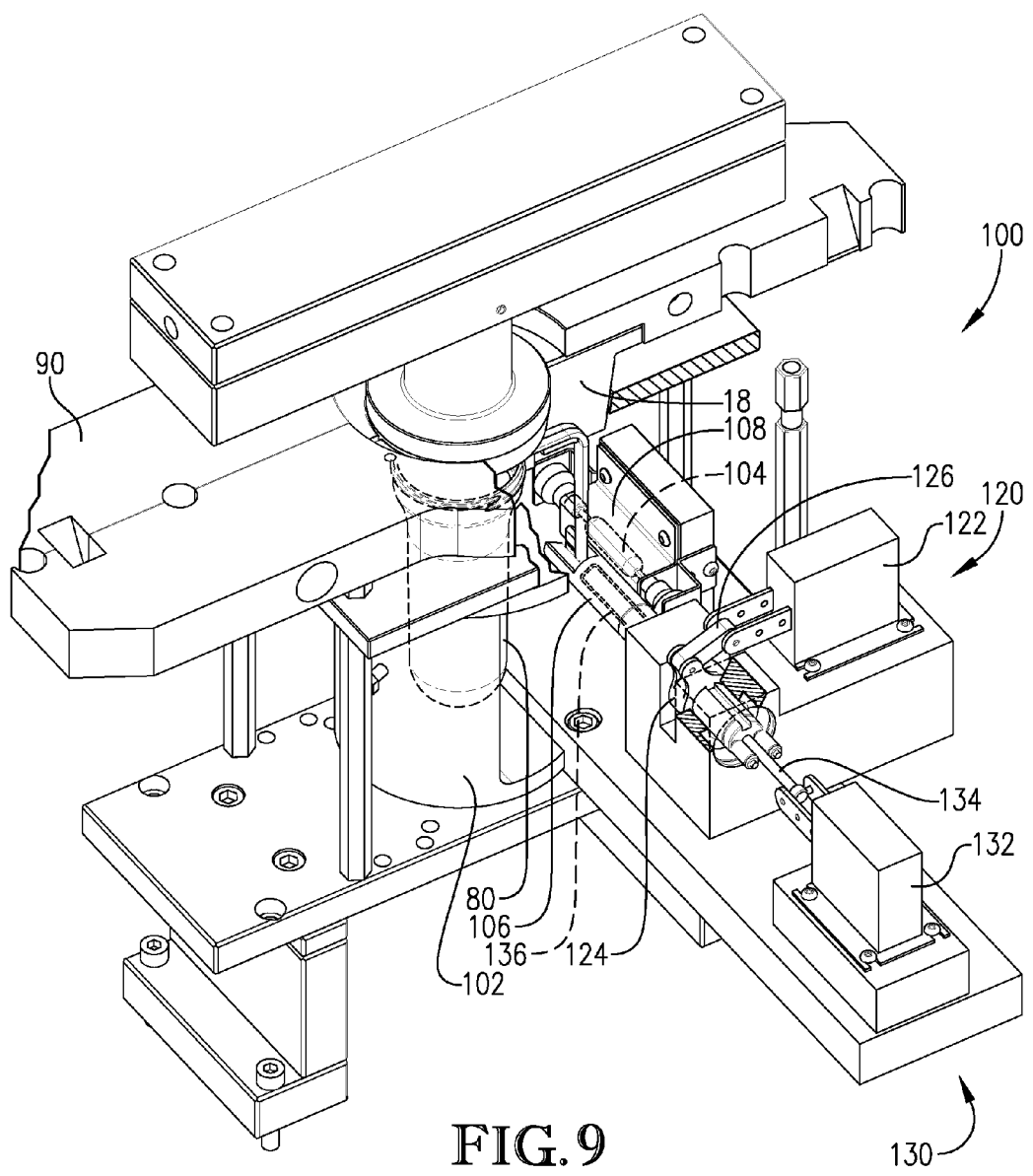
FIG. 9 is an top rear partial perspective view of conditioning station tooling according to embodiments of the present invention, with a portion of the tooling cut away to illustrate a dowel for reshaping a handle of a parison.
Figure 10:
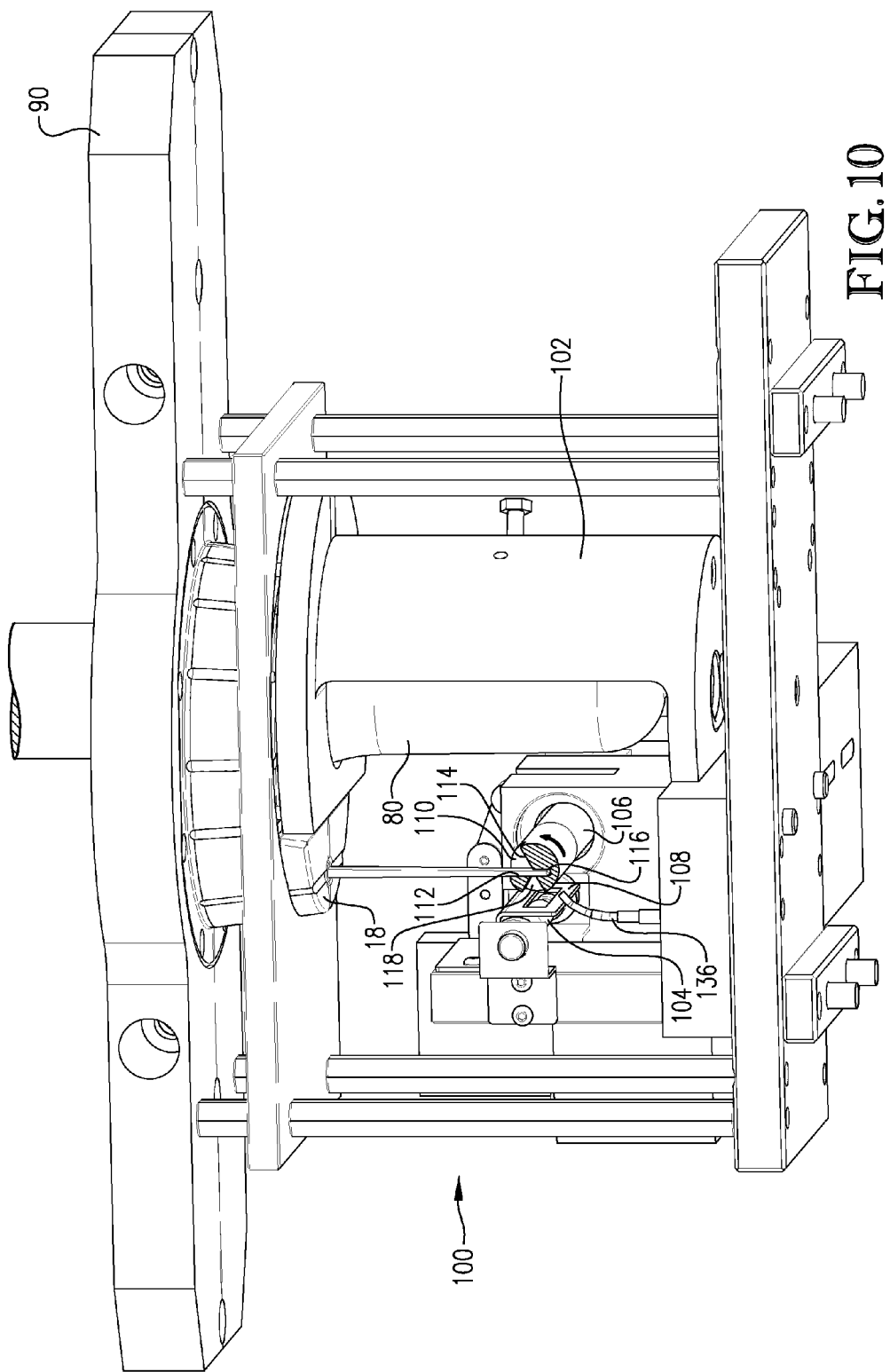
FIG. 10 is bottom front perspective view of the conditioning station tooling from FIG. 9, with the dowel in an initial position and with a portion of a first end of the dowel cut away to illustrate the handle of the parison being received therein.
Figure 11:
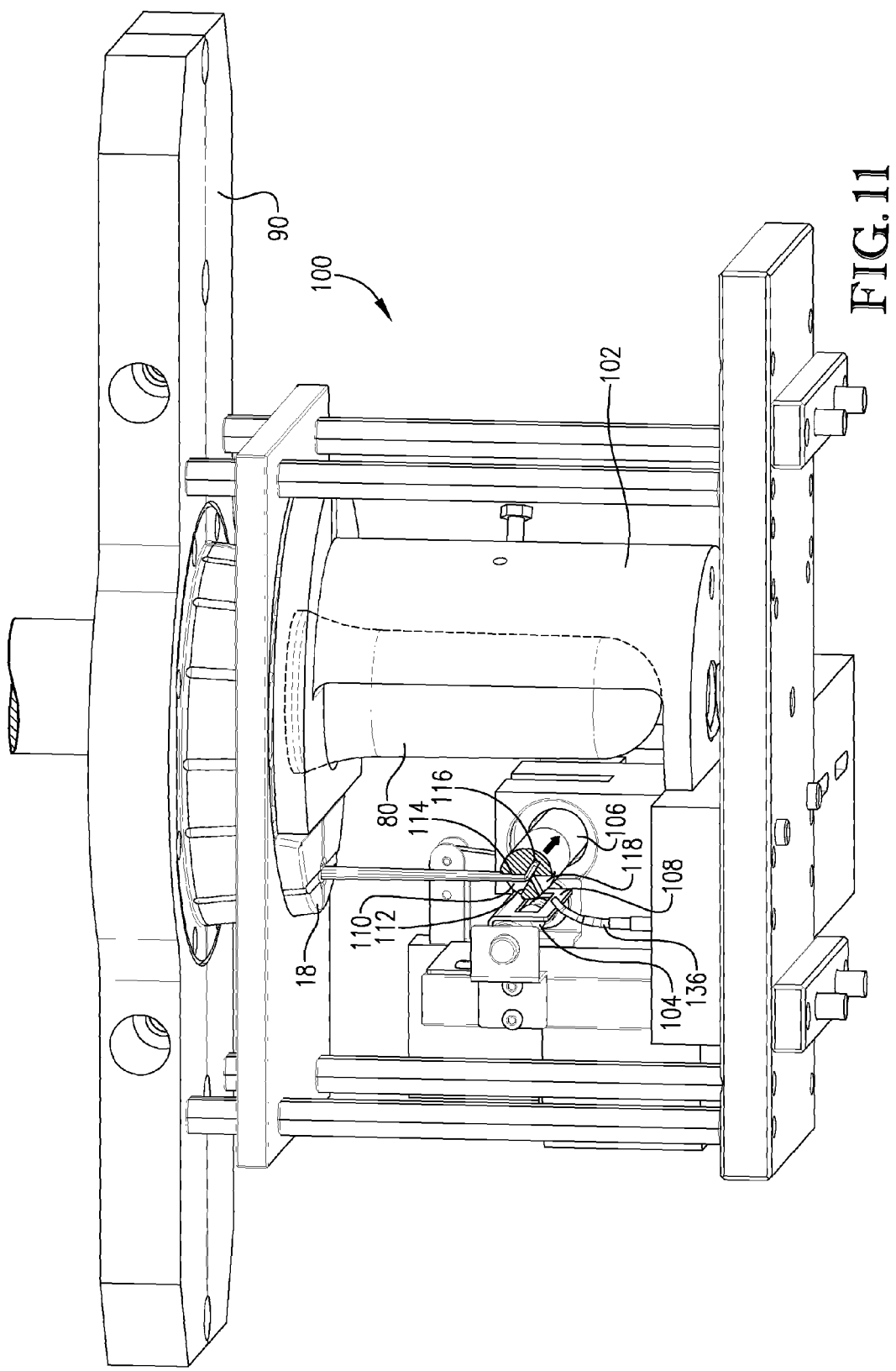
FIG. 11 is bottom front perspective view of the conditioning station tooling from FIGS. 9-10, with the dowel in a second rotated position and with a portion of a first end of the dowel cut away to illustrate the handle of the parison being received and reshaped therein.

With reference to such FIGS. 9-11, embodiments of the present invention may also include conditioning station tooling 100 comprising: a first heat source 102 configured to apply heat to the body of the parison 80, a second heat source 104 configured to apply heat to the handle of the parison 80, and a dowel 106 configured to receive at least a portion of the handle of the parison 80, with the dowel 106 being configured to rotate, such that with the portion of the handle being received within the dowel 106, the dowel 106 is operable to reshape the handle. In some embodiments, the handle will be reshaped to include a bend, a twist, a hole-punch, a split, or an undercut on or through at least a portion of the handle. As such, the conditioning station tooling 100 is configured to reshape a portion of the handle of the parison 80, such that, as will be described in more detail below, the handle is configured to engage with the stretch blow molded article at a second connection point. Although the description provided herein details conditioning station tooling 100 configured for reshaping a handle of a single parison, it is understood that the conditioning station tooling 100 may include a plurality of components, such that the conditioning station tooling 100 is operable to simultaneously reshape the handles of a plurality of parisons.

The first heat source 102 may include any type of heating element typically used in ISBM process to apply heat to a parison in preparation for stretch blowing. For instance, the first heat source 102 may include an electric heating cartridge. In some embodiments, such as illustrated in FIGS. 9-11, the first heat source 102 may be embedded within heat application material, such as a heat pot. The heat pot may be configured to apply heat across a large section of the parison 80.

The second heat source 104 may include any heat source capable of directing a focused beam of heat energy. For example, in some embodiment, the second heat source 104 will comprise a quartz infrared heat source. Additionally, in some embodiments, the second heat source 104 will be associated with a shield 108 configured to surround a portion of the second heat source 104. The shield 108 may comprise a material configured to block portions of the heat energy emitted by the second heat source 104. Additionally, however, the shield 108 may include an opening through which the beam of heat energy can be focused on the handle of the parison 80. As such, the shield 108 is operable to further focus the beam of heat energy emitted by the second heat source 104, as well as to block heat energy from being directed at other portions of the parison 80 that are not required to be heated. Although embodiments described herein include a second heat source 104 for applying heat to the handle of the parison, it should be understood that some embodiments may not require the use of a second heat source 104 to reshape the handle. For example, the second heat transfer channel 50 of the injection station tooling 10 may allow a sufficient amount of heat to be retained within the handle mold 14 such that the injection molded handle will retain enough heat to be reshaped by the conditioning station tooling 100 without heat being applied by the second heat source 104. In other embodiments, the handle cavity of the injection station tooling 10 may have a sufficient volume such that the injection molded parison handle will be formed with a sufficient size to retain enough heat to be allowed to be reshaped by the conditioning station tooling 100 without heat being applied by the second heat source 104.

As illustrated in the figures, and particularly in FIG. 9, the dowel 106 may be configured as an elongated shaft or rod. In certain embodiments, the dowel 106 may be a cylindrical rod; however, in other embodiments, the dowel 106 may have other elongated shapes, such as a hexagonal shaft, a pentagonal shaft, or the like. In some embodiments, the dowel 106 may be a separate, end-piece component that is integrated, or otherwise connected with a second elongated shaft that extends about a common rotational axis, such that both the dowel 106 and the second elongated shaft can rotate together about the axis. Nevertheless, at least a portion of the dowel 106, preferably a first end of the dowel, may include one or more notches formed thereon. The notches may be formed in the dowel 106 via milling or other suitable machining processes.

Figure 12:
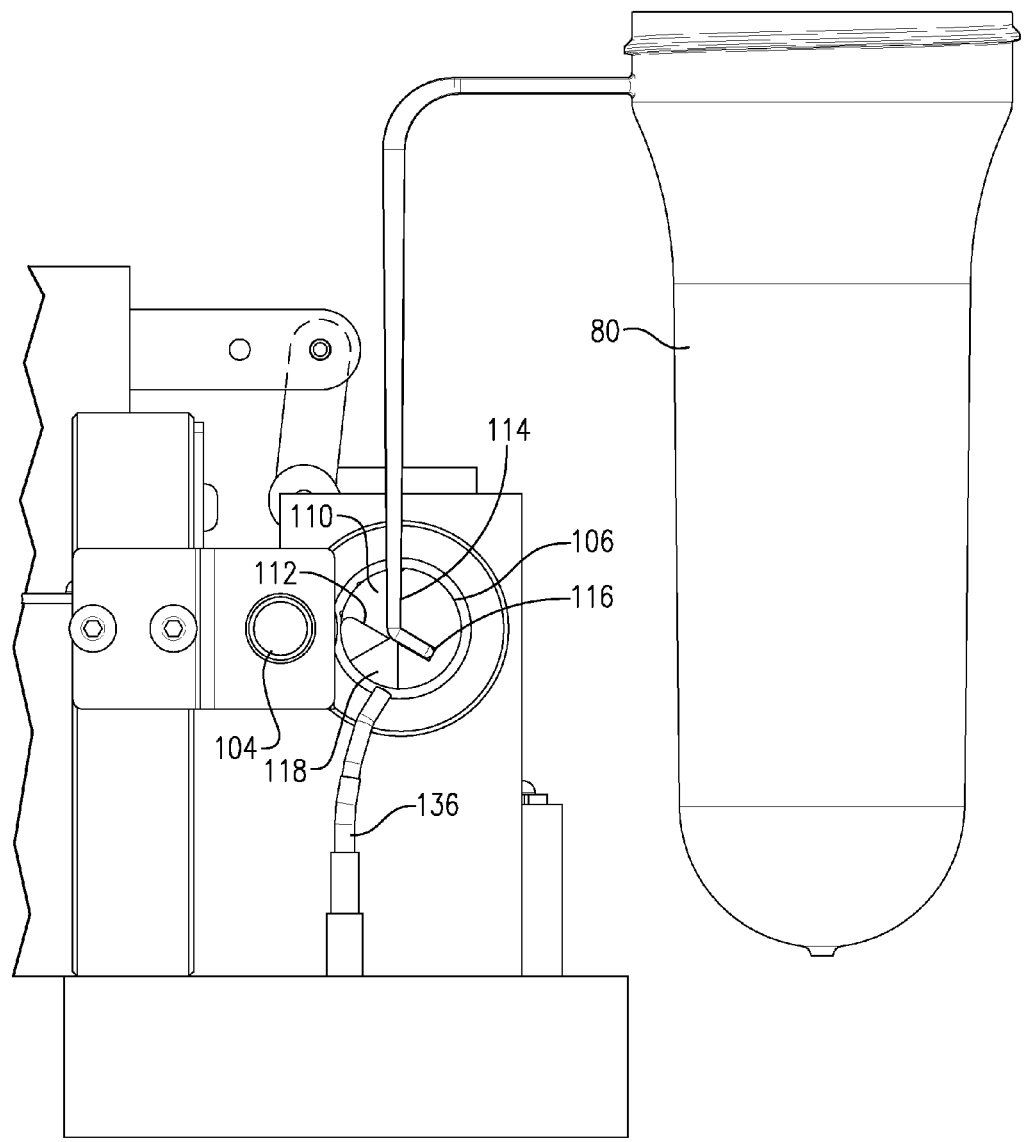
FIG. 12 is a partial enlarged view of the conditioning station tooling of FIG. 11, with the portions of the parison and the dowel enlarged.

With reference to FIGS. 10-12 the dowel may include a first notch 110, which may be v-shaped, and which is formed through an upper portion of the dowel 106 and extending down through a portion of the dowel's 106 thickness to adjacent the rotational axis of the dowel 106. The first notch 110 may include a first side 112 and a second side 114. With the dowel in an initial position, such as illustrated in FIG. 10, the first side 112 of the first notch 106 may extend generally vertically. The second side 114 may be separated from the first side 112 at an angle that may be between 10 and 90 degree, between 20 and 60 degrees, or between 30 and 45 degrees. The dowel 106 may include a second notch 116, which may be rectangular, and which may extend radially from generally adjacent the rotation axis of the dowel 106 downward through a portion of the dowel's 106 thickness. With the dowel 106 in an initial position, such as illustrated in FIG. 10, the second notch 116 may extend generally vertically and may be aligned with the first side 112 of the first notch 110. The second notch 116 and may be sized so as to snuggly receive at least a portion of the handle of the parison 80.

Finally, the dowel 106 may include a third notch 118, which may be v-shaped, and which may be formed through a side portion of the dowel 106 and extending through a portion of the dowel's 106 thickness to adjacent the rotational axis of the dowel 106. With the dowel in the initial position, such as illustrated in FIG. 10, the third notch 118 may be aligned with the second heat source 104. As such, the second heat source 104 is capable of directing the beam of heat energy through the third notch 116 and, with a portion of the handle inserted within the dowel 106, onto the handle, as will be described in more detail below.

With reference to FIG. 9, the conditioning station tooling 100 will, in some embodiments, include a dowel rotation assembly 120 for rotating the dowel 106 about its rotational axis. The dowel rotational assembly 120 may comprise linear actuator 122, a ring spanner 124 for surrounding and engaging an exterior radial surface of the dowel 106, and a linkage assembly 126 for connecting the linear actuator 122 with the ring spanner 124. In such a configuration, actuation of the linear actuator 122 causes a corresponding actuation of the linkage assembly 126. The actuation of the linkage assembly 126 will thereby cause a rotation of the ring spanner 124 and a corresponding rotation of the dowel 106 about its rotational axis.

In more detail, the linear actuator 122 may include any type of actuator, such as solenoid, capable of providing linear actuation. The linkage assembly 126 may comprise one or more linkage arms that hingedly connect the linear actuator 122 to the ring spanner 124. The ring spanner 124 may be a generally ring-shaped component that surrounds a portion of the exterior surface of dowel 106 at a position along the dowel's 106 length. The ring spanner 124 may have an inner circumference that is correspondingly sized and shaped with the exterior surface of the dowel 106. For example, if the dowel 106 is shaped as a cylindrical shaft, the inner circumference of the ring spanner 124 will be circular. As illustrated in FIG. 9, the dowel 106 may be cylindrical with a keyway formed along a portion of its exterior surface. In such embodiments, the ring spanner 124 may have a key configured to fit within the keyway of the dowel 106. In even further alternative embodiments, the dowel 106 may comprise a hexagonal (or other shaped) shaft. In such further embodiments, the inner circumference of the ring spanner 124 will be hexagonal (or other corresponding shape). As such, the ring spanner 124 is operable to impart rotation to the dowel 106, such that a rotation of the ring spanner 124 causes a corresponding rotation of the dowel 106. Furthermore, however, because the ring spanner 124 is correspondingly sized and shaped with the exterior surface of the dowel 106, the ring spanner 124 is configured to allow translational movement of the dowel 106 through an interior space presented by the ring spanner 124. As such, the dowel 106 is operable to translate laterally through the ring spanner 124, as will be discussed below.

In certain embodiments, the conditioning station tooling 100 will also include a dowel actuation assembly 130 for linearly translating the dowel 106, generally along its rotational axis. The dowel actuation assembly 130 may comprise a linear actuator 132 and a linkage assembly 134 for connecting the linear actuator 132 with a second end of the dowel 106. As such, actuation of the linear actuator 132 causes a corresponding actuation of the linkage assembly 134 and, thus, linear actuation of the dowel 106. As with the linear actuator 122 associated with the dowel rotation assembly 120, the linear actuator 132 of the dowel actuation assembly 130 may comprise any type of actuator, such as a solenoid, capable of imparting linear actuation. The linkage assembly 134 may comprise one or more linkage arms that connect the linear actuator 132 with the second end of the dowel 106. As such, the linear actuation assembly 130 is operable to impart linear actuation to the dowel 106, such that the dowel 106 is operable to translate laterally through the ring spanner 124.

In operation, the parison 80 with the integral handle is transferred from the injection station to the conditioning station via the split thread assembly 18 and the carrier plate 90. Once at the conditioning station, the parison 80 is positioned, as illustrated by FIGS. 9-10, such that the body of the parison 80 is adjacent to the first heating element 102 and a portion of the handle is inserted within the first and second notches 110, 116 of the dowel 106. In particular, the handle of the parison 80 is generally orientated vertically, such that the portion of the handle received within the first and second notches 110, 116 is positioned adjacent to the first side 112 of the first notch 110 and is received within the aligned second notch 116. In such a configuration of the parison 80, the first heating element 104 will condition the body of the parison 80 by applying heat to the body.

Additionally, with the portion of the handle inserted within the first and second notches 110, 116 of the dowel 106, the second heating element 104, if required, will direct a beam of heat energy through the third notch 118 and to a bending point (or a reshaping point) of the handle. In some embodiments, the bending point of the handle will be aligned with the rotational axis of the dowel 106. As such, the bending point of the handle will divide the main portion 86 of the handle such that an end portion extends from the bending point to a free end of the handle. As described below, the heat energy imparted by the second heating element 104 will be sufficient to allow for the end portion of the handle to be bent and/or otherwise reshaped about the bending point, via the force imparted by the rotation of the dowel 106.

In more detail, and with reference to FIG. 9, after the second heating element 104 has sufficiently heated the bending point of the handle, the linear actuator 122 of the dowel rotational assembly 120 will actuate to thereby extend or retract the linkage members 126. The extension or retraction of the linkage members 126 will cause a corresponding rotation of the ring spanner 124, which will cause a rotation of the dowel 106. The rotation of the dowel 106, with the end portion of the parison 80 handle inserted therein, will cause the end portion of the handle to be bent and/or otherwise reshaped about the bending point, such as illustrated in FIGS. 11-12. In some embodiments, the rotation of the dowel will cause the end portion of the handle to bend between 10 to 170 degrees, between 20 to 160 degrees, or between 30 to 150 degrees from its initial vertical position. Such bends may cause the end portion to be directed towards or away from the body of the parison 80, with such bending directions dependent on a rotation direction of the dowel 106.

In some embodiments, the amount by which the end portion of the handle can be bent and/or otherwise reshaped will be dependent on the size of the first, v-shaped notch 110. Specifically, with reference to FIGS. 10-12, the angle by which the second side 114 of the first notch 110 is separated from the first side 112 will define a maximum angle by which the end portion of the handle will be bent. For example, with the second side 114 separated from the first side 112 by an angle between 10 and 90 degrees, between 20 and 60 degrees, or between 30 and 45 degrees, the end portion of the handle will be capable of being bent by angle between 10 and 90 degrees, between 20 and 60 degrees, or between 30 and 45 degrees. Remaining with FIGS. 10-12, the second side 114 of the first notch 110 is separated from first side by about 45 degrees. In such a configuration, a counter-clockwise rotation (as viewed in the drawings) of the dowel 106 will cause the end portion of the handle to bend toward the body of the parison 80. The dowel 106 will rotate until the second side 114 of the first notch 110 is positioned adjacent to or contacts the handle, as illustrated in FIGS. 11 and 12. As such, the dowel 106 will have rotated counter-clockwise about 45 degrees, which causes the end portion of the handle to be bent toward the body of the parison 80 by about 45 degrees. In certain preferred embodiments, it may be preferable for the end portion of the handle to be bent toward the body of the parison 80 between about 30 to 45 degrees.

Once the end portion of the handle has been reshaped, certain embodiments of the present invention may provide for the handle to be cooled via one or more cooling devices 136. In some embodiment, such as illustrated in FIG. 9, the cooling devices 136 may include heat transfer conduits formed within the dowel 106 and operable to transfer heat from the handle via the dowel 106. In other embodiments, such as illustrated in FIGS. 10-12, the cooling devices 136 may include a focused air jet operable to direct cooled air on the parison handle. It should be understood that the cooling devices 136 may, in some embodiments, be configured to apply heat to the handle, as opposed to cooling the handle. For example, the heat transfer conduits could pass heated fluid through the dowel so as to transfer heat to the handle, while the focused air jet could direct heated air toward the handle. Regardless of whether cooling devices 136 are required, once the end portion of the handle has been reshaped to the appropriate position, such as shown in FIGS. 11 and 12, the handle can be removed from within the dowel 106 by actuating the dowel 106 via the dowel actuation assembly 130. In particular, the linear actuator 132 retracts the linkage assembly 134 so as to linearly actuate the dowel 106 toward the linear actuator 132 and, thus, away from the handle of the parison 80. The dowel actuation assembly 130 is configured to retract the dowel 106 enough to entirely separate the dowel 106 from the handle. Once the dowel 106 has been retracted from the handle, the parison 80 can be lifted away from the conditioning station and transferred to the stretch blow station, via the thread split assembly 18 and the carrier plate 90. Once the parison 80 has been removed, the dowel rotation assembly 120 and the dowel actuation assembly 130 can rotate/actuate the dowel 106 back in to its initial position to receive a new handle of a new parison 80.

Figure 13:
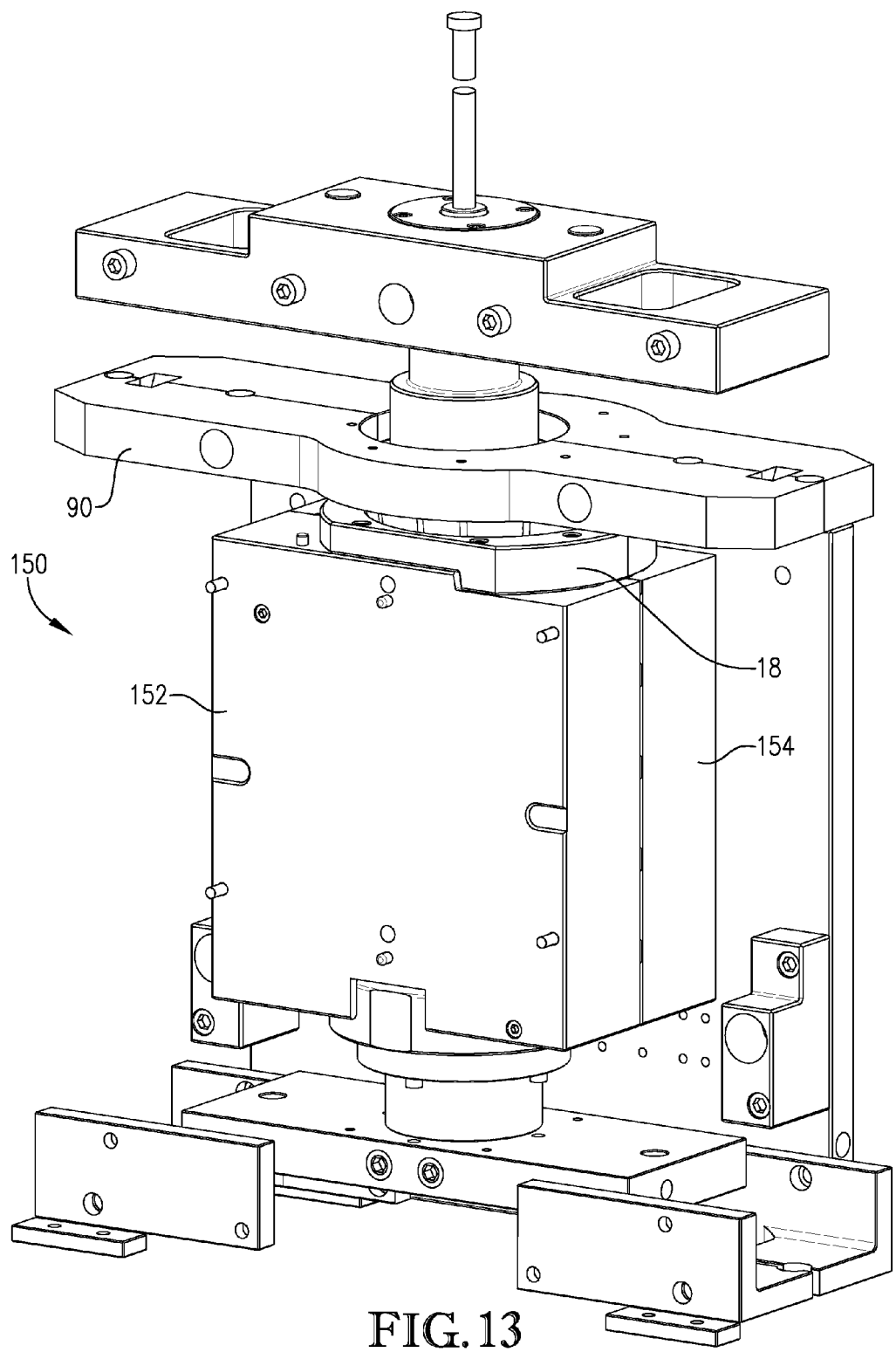
FIG. 13 is a perspective view of stretch blow station tooling according to embodiments of the present invention.
Figure 14:
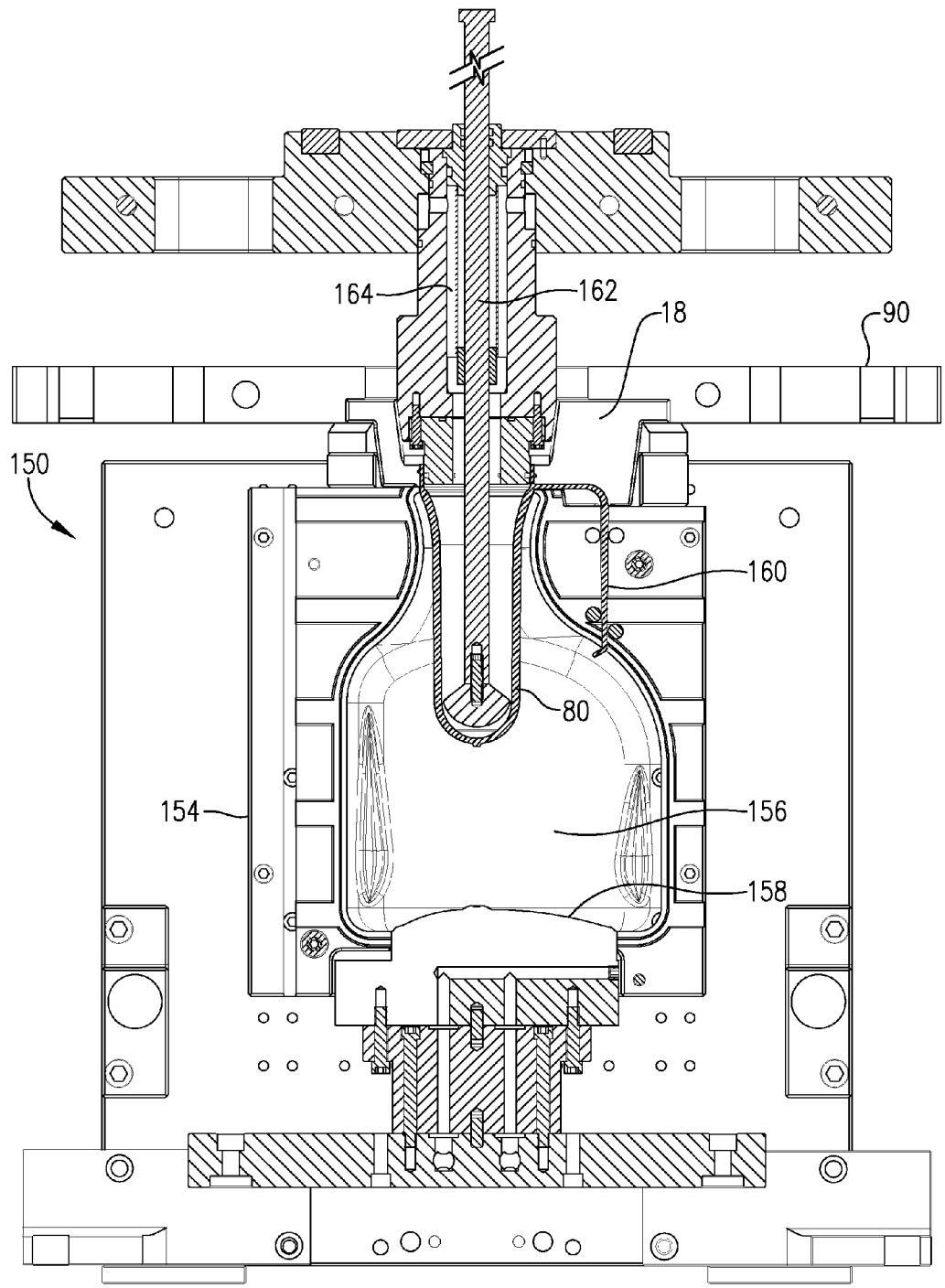
FIG. 14 is a perspective cross-section view of the stretch blow station tooling of FIG. 13, showing portions of a blow cavity and handle-supporting cavity, with a parison positioned therein.

As indicated above, the ISBM machine will transfer the parison 90 with the integral handle to the stretch blow station where it can be formed into a final molded article. Referring to FIG. 13-14, embodiments of the present invention include stretch blow tooling 150 for stretch blowing the parison 80 into the final molded article. The stretch blow tooling 150 will include a blow mold assembly comprising first and second blow mold halves 152, 154 configured to alternate from an open position to a closed position. The first and second blow mold halves 152, 154 each have a body cavity half 156 formed therein (only the body cavity half 156 of second blow mold half 154 is shown in FIG. 14). When first and second blow mold halves 152, 154 are in their closed position, the directly opposed body cavity halves 156 cooperate to define a blow cavity. The blow cavity will have a shape that corresponds to an intended shape of the final molded article. In certain embodiments, the blow station tooling 150 is also provided with a bottom mold surface 158 that cooperates with the body cavity halves 156 to define a closed bottom portion of the blow cavity. The bottom mold surface 158 may function to provide a corresponding upwardly arched cavity or dome in a bottom of the final molded article produced within the mold cavity. Although the description provided herein details a single blow mold assembly, it is understood that the stretch blow tooling 150 may include a plurality of blow mold assemblies, such that the stretch blow tooling 150 is operable to simultaneously blow mold a plurality of molded articles having integral handles.

In some embodiments, the first and second blow mold halves 152, 154 of the blow mold assembly will each additionally include a handle-supporting channel 160. When the first and second blow mold block halves 152, 154 are in their closed position, the directly opposed handle-supporting channels 160 cooperate to define a handle-supporting cavity. In certain embodiments, such as illustrated in FIG. 14, the handle-supporting cavity, as defined by the handle-supporting channels 160, may extend down from a top portion of the blow mold assembly and into communication with the blow cavity. In some embodiments, as illustrated in FIG. 14, the handle-supporting cavity of the blow mold assembly will only be long enough to receive part of the main portion 86 of the handle of the parison 80. In such embodiments, the handle-supporting cavity of the blow mold assembly may have a length that allows for the end portion of the handle of the parison to extend within the blow cavity of the blow mold assembly. In embodiments in which the end portion of the handle is reshaped at the conditioning station, the reshaped end portion will be positioned within the blow cavity. As will be described below, by allowing the end portion of the handle to be positioned within the blow cavity, the body of the parison 80 can be stretch blown such that the final molded article is stretch blown around the end portion of the handle, thereby providing for the handle to be connected to the molded article at two connection points.

Figure 15:
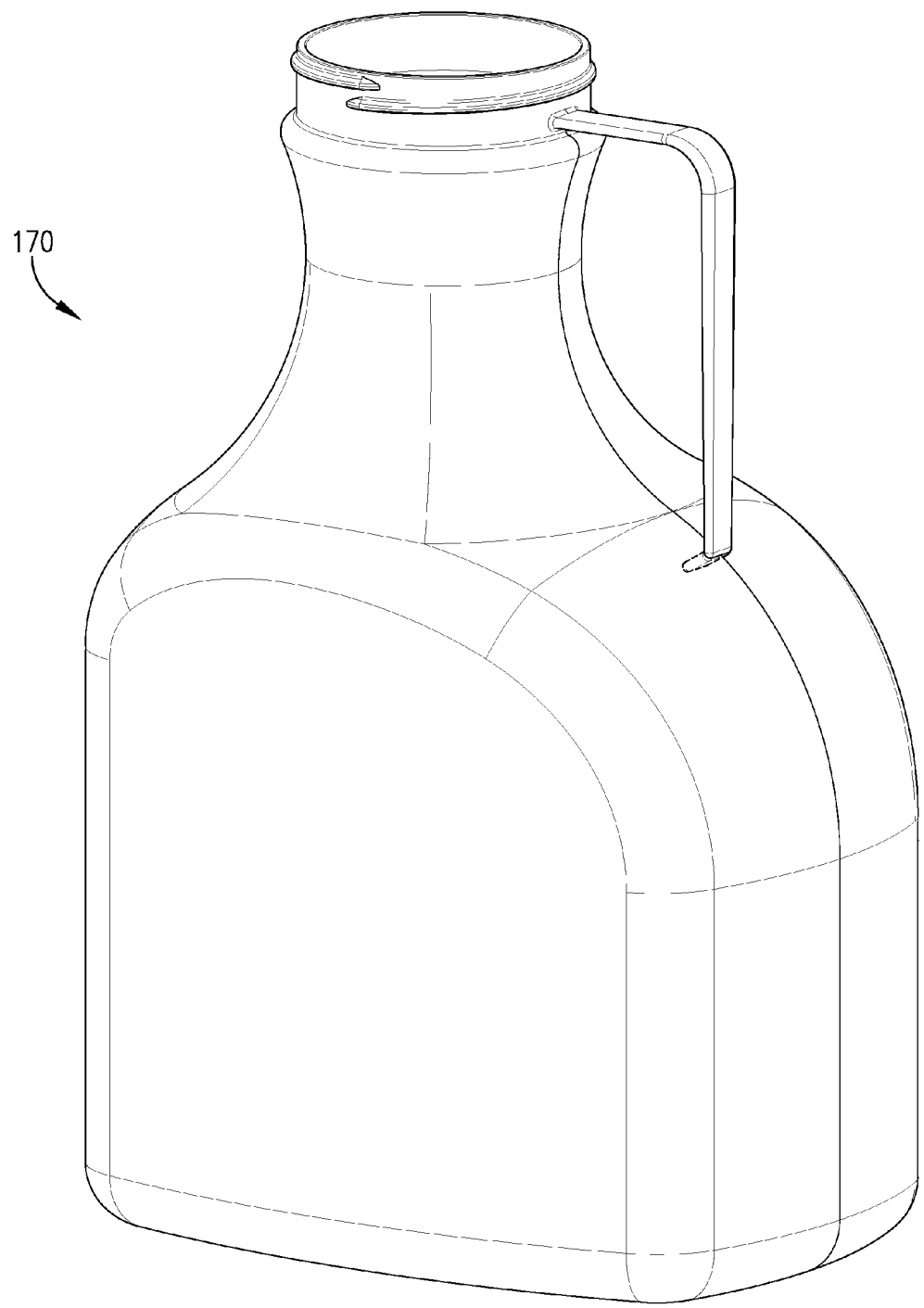
FIG. 15 is a perspective view of a stretch blow molded article formed according to embodiments of the present invention.

With the stretch blow station tooling 150 described above, the final molded article can be stretch blown from the parison 80. To begin, as shown in FIG. 14, the parison 80 is inserted, via the thread lock assembly 18 and the carrier plate 90, between the first and second blow mold halves 152, 154. Specifically the body of the parison 80 is positioned between the blow mold halves 152, 154 and the handle of the parison 80 is positioned between the handle-supporting channels 160. The first and second blow mold halves 152, 154 are then actuated to their closed position, and a stretch rod 162 is inserted within the body of the parison 80. Embodiments provide for the stretch blow tooling 150 to impart both radial and axial stretching to the parison 80. In particular, the stretch rod 162 is inserted down within the body of the parison 80 while air is simultaneously blown from a blow core 164 into the parison 80. As such, the stretch blow station tooling 150 will stretch the parison 80 both axially and radially. Thus, the stretch blow station tooling 150 will stretch blow the parison 80 into a final molded article 170 that has a shape that corresponds with the blow cavity, such as illustrated in FIG. 15.

Figure 16:
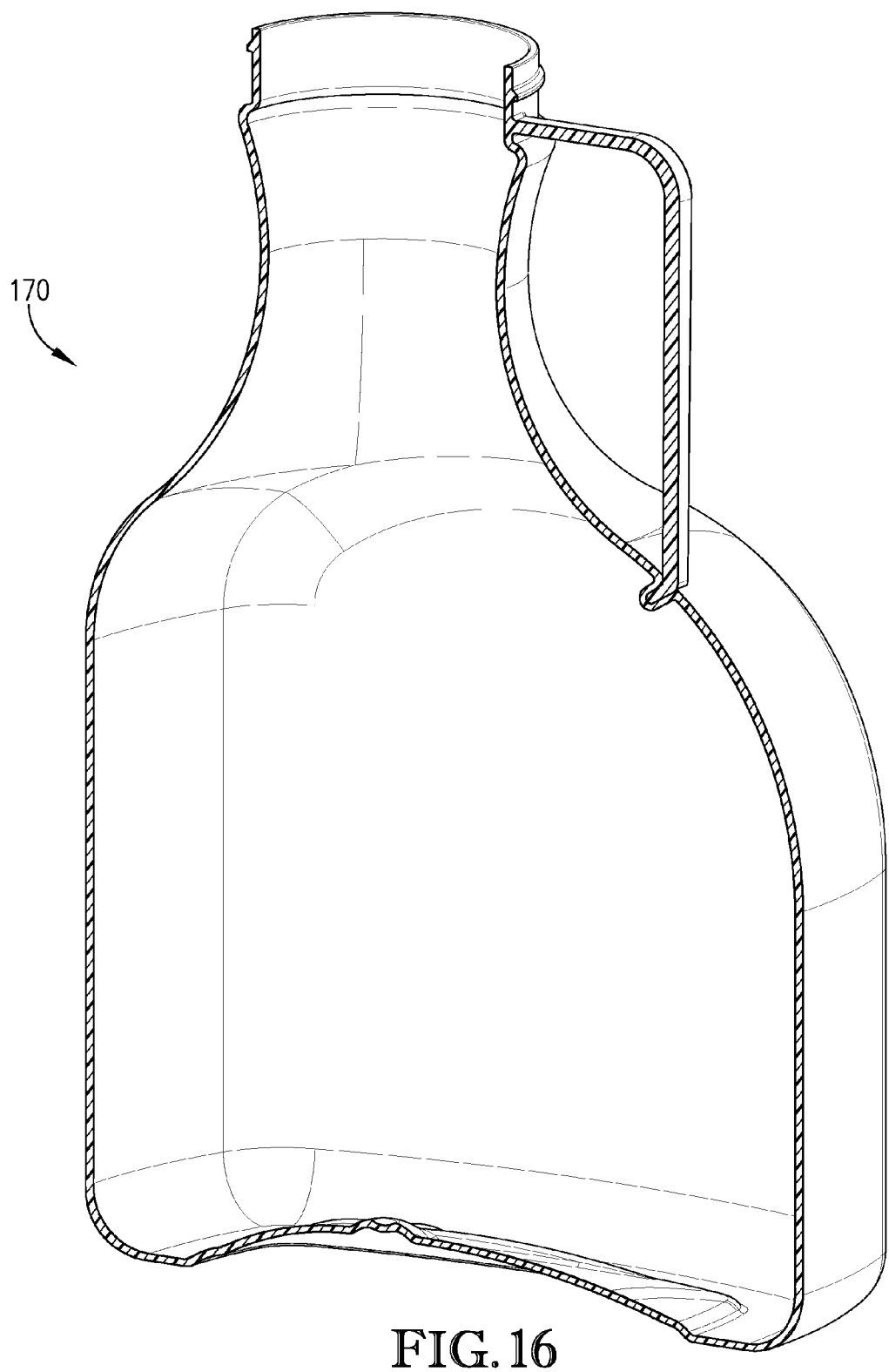
FIG. 16 is a perspective cross-section view of the stretch blow molded article from FIG. 15.

As previously described, the end portion of the handle of the parison 80 may extend from the handle-supporting cavity and into the blow cavity, as shown in FIG. 14. As such, the parison 80 may be stretch blown into a final molded article 170, with the article 170 being stretch blown into engagement with the end portion of the handle. In some embodiments, a portion of the outer wall of the body of the stretch blow molded article 170 may overlap the end portion of the handle such as shown in FIGS. 15-16. As such, when the handle is formed with the end portion being reshaped, a portion of the outer wall of the body of the molded article 170 will overlap with the reshaped end portion, so as to provide a secure engagement between the end portion of the handle and the outer wall of the body of the article molded 170. In other embodiments, a portion of the outer wall of the body of the molded article 170 may surround the end portion of the handle, with the end portion of the handle being inserted within an interior of the molded article 170. Regardless of the specific type of engagement, embodiments provide for the end of the handle to engage with the outer wall of the body of the molded article 170, such that the handle is secured to the molded article at two connection points (e.g., at the neck and the body).

Upon forming the molded article at the stretch blow station, the molded article will be transferred, via the thread split assembly 18 and carrier plate 90, to the ejection station (not shown in the drawings). The ejection station generally comprises an ejection rod, a stripper plate, or any other device configured for pushing, pulling, dumping, or otherwise stripping the molded article from the thread split assembly 18 and the carrier plate 90 once the parison 80 has been stretch blown into the molded article 170. For example, once at the injection station, the thread split halves 20, 22 may be actuated from the closed position to the opened position. As such, the thread split assembly 18 will no longer secure the molded article 170 by its neck. Next, an ejection rod may be driven down against the neck of the molded article 170 so as to dislodge the molded article entirely from the thread split assembly 18. As such, the molded article 170 will be ejected from the ISBM machine.

Given the description provided above, embodiments of the present invention include a process for forming an injection stretch blow molded article 170 via an injection stretch blow molding machine. The process includes an initial step of injecting a resin into a parison-forming cavity to form a parison 80 having a body and a handle extending from the body, where the injecting step includes injecting the resin into a body cavity of the parison-forming cavity, and where a portion of the resin injected into the body cavity passes from the body cavity into a handle cavity. A next step includes conditioning at least a portion of the parison 80 with a heat source, where the conditioning step includes reshaping an end portion of the handle, such that the end portion is at least partially orientated toward the body of the parison 80. A next step include stretch blowing the parison to form a molded article 170 having an integral handle, where the stretch blowing step includes stretch blowing the body of the parison 80 until a portion of the body engages the end portion of the handle. A final step includes ejecting the molded article 170 from the injection stretch blow molding machine.

In certain embodiments, such a process includes bending the end portion of the handle by an angle of between 30-45 degrees. Furthermore, in some embodiments, during the stretch blowing step, the end portion of the handle of the parison 80 is positioned within an interior of the blow mold cavity, such that a portion of the body of the parison 80 can be stretch blown around the end portion of the handle.

Although the invention has been described with reference to the preferred embodiment illustrated in the attached drawing figures, it is noted that equivalents may be employed and substitutions made herein without departing from the scope of the invention as recited in the claims.

What is claimed is:

1. Injection station tooling for injection molding at least one parison with an injection stretch blow molding machine, said tooling comprising:
   at least one cavity block;
   a body mold supported within said cavity block;
   a handle mold supported within said cavity block; and
   a thread split assembly positioned adjacent to said cavity block, with said thread split assembly comprising first and second thread split halves shiftable between an open position and a closed position,
   wherein said body mold, said handle mold, and said thread split assembly cooperatively define a parison-forming cavity, with the parison-forming cavity including a body cavity for forming a body of the parison and a handle cavity for forming a handle of the parison,
   wherein said thread split assembly includes a channel fluidly connecting said body mold and said handle mold, wherein said channel forms a part of the handle cavity.

2. The tooling of claim 1, wherein a longitudinal axis of said body mold is generally parallel with a longitudinal axis of said handle mold.

3. The tooling of claim 1, wherein the body cavity includes a main portion for forming a main portion of the body of the parison and a neck portion for forming a neck portion of the body of the parison.

4. The tooling of claim 3, wherein the handle cavity includes a main portion for forming a main portion of the handle of the parison and a connection portion for forming a connection portion of the handle of the parison.

5. The tooling of claim 4, wherein said body mold defines the main portion of the body cavity and said thread split assembly defines the neck portion of the body cavity.

6. The tooling of claim 5, wherein said handle mold defines a main portion of the handle cavity and said thread split assembly defines the connection portion of the handle cavity.

7. The tooling of claim 6, wherein the channel of said thread split assembly defines the connection portion of the handle cavity, and wherein said channel fluidly connects the body cavity with the main portion of the handle cavity.

8. The tooling of claim 7, wherein with said thread split halves in the closed position, said thread split assembly is generally elongated and includes first and second ends, wherein one of said ends comprises an enlarged section, and wherein said channel is formed through the enlarged section.

9. The tooling of claim 7, wherein said channel includes a first section that is generally perpendicular with the body cavity, a second section that is generally parallel with the body cavity, and an arcuate section linking the first and second sections.

10. The tooling of claim 1, wherein each of said body and handle molds is associated with independent heat transfer channels for independently adjusting a temperature of said molds.

11. Conditioning station tooling for an injection stretch blow molding machine, wherein the tooling is configured for conditioning at least one parison having a handle, said tooling comprising:
at least one dowel configured to receive at least a portion of the handle of the parison,
wherein said dowel is configured to rotate, such that with the portion of the handle received within said dowel, said dowel is operable to reshape at least a portion of the handle.

12. The tooling of claim 11, further including
a dowel rotation assembly for rotating said dowel about an axis of rotation; and
a dowel actuation assembly for linearly translating said dowel along the axis of rotation.

13. The tooling of claim 12, wherein said dowel rotation assembly comprises:
a linear actuator;
a ring spanner for surrounding and engaging an external surface of said dowel; and
a linkage assembly for connecting said linear actuator with said ring spanner,
wherein actuation of said linear actuator causes, via said linkage assembly, a rotation of said ring spanner and the rotation of said dowel.

14. The tooling of claim 12, wherein the dowel actuation assembly comprises:
a linear actuator; and
a linkage assembly for connecting said linear actuator with an end of said dowel,
wherein actuation of said linear actuator causes, via said linkage assembly, the linear actuation of said dowel.

15. The tooling of claim 11, wherein said dowel includes a notch for receiving the portion of the handle of the parison, and wherein the portion is an end of the handle.

16. The tooling of claim 15, further comprising:
a heat source configured to apply heat to the handle of the parison,
wherein said heat source is configured to direct heat at a bending point on the handle of the parison, wherein the bending point separates an end portion of the handle from a remaining portion of the handle.

17. The tooling of claim 16, wherein said dowel is configured to reshape the end portion of the handle by bending the end portion about the bending point by an angle of between 30-45 degrees.

18. The tooling of claim 16, wherein the heat source comprises an infrared heat source.

19. The tooling of claim 11, further comprising:
a cooling device configured to reduce a temperature of the handle of the parison,
wherein said cooling device is configured to reduce the temperature of a bending point on the handle of the parison, wherein the bending point separates an end portion of the handle from a remaining portion of the handle.

20. The tooling of claim 19, wherein the cooling device comprises an air jet.

21. A process for forming at least one injection stretch blow molded container with an injection stretch blow molding machine, the process comprising:
(a) injecting a resin into a parison-forming cavity to form a parison having a body and a handle extending from the body,
wherein said injecting of step (a) includes injecting the resin into a body cavity of the parison-forming cavity, and wherein a portion of the resin injected into the body cavity passes from the body cavity to a handle cavity, wherein at least a portion of the handle cavity is defined by a channel extending within a thread split assembly, with the channel in fluid connection with the body cavity;
(b) conditioning at least a portion of the parison,
wherein said conditioning of step (b) includes reshaping an end portion of the handle, such that the end portion is at least partially orientated toward the body of the parison;
(c) stretch blowing the parison to form a container having an integral handle,
wherein said stretch blowing of step (c) includes stretch blowing the body of the parison until a portion of the body engages the end portion of the handle; and
(d) ejecting the container from the injection stretch blow molding machine.

22. The process of claim 21, wherein during said condition of step (b), the end portion of the handle is bent by an angle of between 30-45 degrees.

23. The process of claim 21, wherein during said stretch blowing of step (c), the body of the parison is stretch blown such that the end of the handle is surrounded by a portion of the body.

24. Stretch blow station tooling for stretch blowing at least one parison into a molded article with an injection stretch blow molding machine, said tooling comprising:
at least one blow mold assembly including first and second blow mold halves shiftable between an open position and a closed position; and
a thread split assembly for supporting the parison with respect to the blow mold assembly,
wherein said first and second blow mold halves each include a body cavity half formed therein, wherein in the closed position, said body cavity halves of said first and second blow mold halves are aligned to define a blow cavity, wherein said first and second blow mold halves each include a handle channel formed therein, wherein in the closed position, said handle channels of said first and second blow mold halves are aligned to define a handle-supporting cavity wherein said thread split assembly includes a channel fluidly connecting the blow cavity and the handle-supporting cavity.

25. The tooling of claim 24, wherein the handle-supporting cavity is fluidly connected with the blow cavity via the channel of said thread split assembly.

26. The tooling of claim 24, wherein the blow cavity is configured to receive a body of the parison, and wherein the handle-supporting cavity is configured to receive a portion of a handle of the parison.

27. The tooling of claim 26, wherein the handle-supporting cavity is sized such that an end portion of the handle will extend from the handle-supporting cavity and into the blow cavity.

* * * * *